United States Patent
Lelchuk (12)

(10) Patent No.: US 10,340,597 B2
(45) Date of Patent: Jul. 2, 2019

(54) KIT FOR FACILITATING TRANSMISSION OF WIRELESS LOCAL-AREA NETWORK RADIO SIGNALS OVER A PRE-EXISTING COAXIAL CABLE DISTRIBUTION NETWORK

(71) Applicant: Timothy Lelchuk, Overland Park, KS (US)

(72) Inventor: Timothy Lelchuk, Overland Park, KS (US)

( * ) Notice: Subject to any disclaimer, the term of this patent is extended or adjusted under 35 U.S.C. 154(b) by 9 days.

(21) Appl. No.: 15/913,525

(22) Filed: Mar. 6, 2018

(65) Prior Publication Data

US 2018/0261918 A1 Sep. 13, 2018

Related U.S. Application Data

(60) Provisional application No. 62/468,357, filed on Mar. 7, 2017.

(51) Int. Cl.
| | |
|---|---|
| *H04B 1/00* | (2006.01) |
| *H04L 12/28* | (2006.01) |
| *H01Q 5/50* | (2015.01) |
| *H04B 17/10* | (2015.01) |
| *H04W 84/12* | (2009.01) |
| *H01Q 1/22* | (2006.01) |
| *H04W 24/02* | (2009.01) |
| *H04W 88/08* | (2009.01) |

(52) U.S. Cl.
CPC ............. *H01Q 5/50* (2015.01); *H01Q 1/2291* (2013.01); *H04B 1/0064* (2013.01); *H04B 17/103* (2015.01); *H04W 24/02* (2013.01); *H04W 84/12* (2013.01); *H04W 88/085* (2013.01)

(58) Field of Classification Search
CPC ....... H04B 1/00; H04L 12/28; H04L 12/2801; H04L 12/2803; H04L 12/2838; H04L 12/2841; H01Q 5/50
See application file for complete search history.

(56) References Cited

U.S. PATENT DOCUMENTS

| 8,532,488 B2* | 9/2013 | Nielsen | H04B 3/50 398/67 |
|---|---|---|---|
| 2017/0070365 A1* | 3/2017 | Varmani | H04L 12/66 |

* cited by examiner

*Primary Examiner* — Dean O Takaoka (57) ABSTRACT

A kit for facilitating transmission of wireless local-area network radio signals over a pre-existing coaxial cable distribution network is disclosed. The kit may include a splitter including at least one input port configured to be communicatively coupled with at least one external antenna connector of a wireless local-area network router. Further, the splitter may include a plurality of output ports configured to be communicatively coupled to a plurality of cables of the cable distribution network. Further, the kit may include a cable impedance matching unit coupled to the at least one external antenna connector of the wireless local-area network router. Further, the kit may include a plurality of antennas corresponding to a plurality of terminal ends of the cable distribution network. Further, an antenna of the plurality of antennas may include an antenna element, an antenna connector and an antenna impedance matching unit.

20 Claims, 10 Drawing Sheets

KIT FOR FACILITATING TRANSMISSION OF WIRELESS LOCAL-AREA NETWORK RADIO SIGNALS OVER A PRE-EXISTING COAXIAL CABLE DISTRIBUTION NETWORK

The current application claims a priority to the U.S. Provisional Patent application Ser. No. 62/468,357 filed on Mar. 7, 2017.

FIELD OF THE INVENTION

The present disclosure generally relates to the field of telecommunications. More specifically, the present disclosure relates to methods, systems, devices and kits for facilitating transmission of wireless local-area network radio signals over a pre-existing coaxial cable distribution network.

BACKGROUND OF THE INVENTION

In recent years, the use of Wi-Fi for wireless Internet access and local-area network (LAN) file transfers has expanded to support real-time applications that traditionally required wireline connections for optimal packet delivery and minimal latency. While emerging Wi-Fi standards now support multi-path signal propagation and beamforming, signal propagation may remain limited where interference and obstructions exist indoors. The use of Wi-Fi range extenders and meshed access points can further reduce Wi-Fi throughput and introduce new sources of latency without resolving the interference existing between access points, while the 802.11r standard for seamless hand-off between access points is not commonly available in consumer-grade Wi-Fi equipment. Various existing in-building wireless (IBW) implementations for distributed antenna systems (DAS) require purpose-built facilities or extensive renovations to plenum and riser space, in addition to the deployment of new structured cabling and expensive equipment for aggregating signals. However, these implementations may not be suitable for the average individual seeking to improve the range of a private Wi-Fi LAN within a single-family housing unit or commercial office.

SUMMARY OF THE INVENTION

A kit for facilitating transmission of wireless LAN radio signals over a pre-existing coaxial cable distribution network is provided. The kit may include a splitter including at least one input port and a plurality of output ports. Further, the at least one input port may be configured to be communicatively coupled with at least one external antenna connector of a wireless LAN router. Further, the plurality of output ports may be configured to be communicatively coupled to a plurality of cables of the pre-existing coaxial cable distribution network. Further, the splitter may be configured to provide a plurality of bidirectional signal pathways between the at least one input port and the plurality of output ports. Further, an operating frequency range of the plurality of bidirectional signal pathways may match at least one frequency band of the wireless LAN radio signals. Further, the kit may include a cable impedance matching unit coupled to the at least one external antenna connector of the wireless LAN router. Further, the cable impedance matching unit may be configured to match an output port impedance of the plurality of output ports with a cable impedance of the plurality of cables. Further, the kit may include a plurality of antennas corresponding to a plurality of terminal ends of the pre-existing coaxial cable distribution network. Further, an antenna of the plurality of antennas may include an antenna element configured to perform wireless transmission and reception of the wireless LAN radio signals. Further, the antenna may include an antenna connector configured to be communicatively coupled to a terminal connector associated with a terminal end of the plurality of terminal ends. Further, the antenna may include an antenna impedance matching unit configured to match an antenna impedance of the antenna element with a cable impendence of the terminal connector. Further, the kit may include at least one attenuator. Further, a first end of at least one attenuator may be configured to be communicatively coupled to at least one output port of the plurality of output ports. Further, a second end of the at least one attenuator may be configured to be communicatively coupled to at least one cable of the plurality of cables. Further, the at least one attenuator may be configured to provide delay equalization and a predetermined common attenuation across the plurality of cables.

According to some embodiments, a kit for facilitating transmission of wireless LAN radio signals over a pre-existing coaxial cable distribution network is provided. The kit may include a splitter including at least one input port and a plurality of output ports. Further, the at least one input port may be configured to be communicatively coupled with at least one external antenna connector of a wireless LAN router. Further, the plurality of output ports may be configured to be communicatively coupled to a plurality of cables of the cable distribution network. Further, the splitter may be configured to provide a plurality of bidirectional signal pathways between at least one input port and the plurality of output ports. Further, an operating frequency range of the plurality of bidirectional signal pathways may match at least one frequency band of the wireless LAN radio signals. Further, the kit may include a cable impedance matching unit configured to be communicatively coupled with at least one external antenna connector of a wireless LAN router and may be configured to match an output port impedance of the plurality of output ports with a cable impedance of the plurality of cables. Further, the kit may include a plurality of antennas corresponding to a plurality of terminal ends of the cable distribution network. Further, an antenna of the plurality of antennas may include an antenna element configured to perform wireless transmission and reception of the wireless LAN radio signals. Further, the antenna may include an antenna connector configured to be communicatively coupled to a terminal connector associated with a terminal end of the plurality of terminal ends. Further, the antenna may include an antenna impedance matching unit configured to match an antenna impedance of the antenna element with a cable impendence of the terminal connector.

DETAILED DESCRIPTIONS OF THE INVENTION

In the following description, reference is made to the accompanying drawings, describing various embodiments in which the invention may be implemented. It is to be understood that those skilled in the art will be able to devise structural and functional embodiments relating to the specific placement of kit components other than those explicitly described herein that are nevertheless included within the scope of the present invention. Additionally, the embodiments shown in the accompanying drawings may be implemented in various forms of hardware, inclusive of regional or application-specific differences in coaxial connectors, cabling standards, the angle or orientation of connector joints, and the specific split ratio of splitter/combiner devices, with potential implementations not limited to the forms of hardware explicitly described herein, provided that the resulting insertion loss, isolation, amplitude and phase balance, and voltage standing wave ratios permit signal propagation and signal-to-noise ratios acceptable for the given application.

Figure 1:
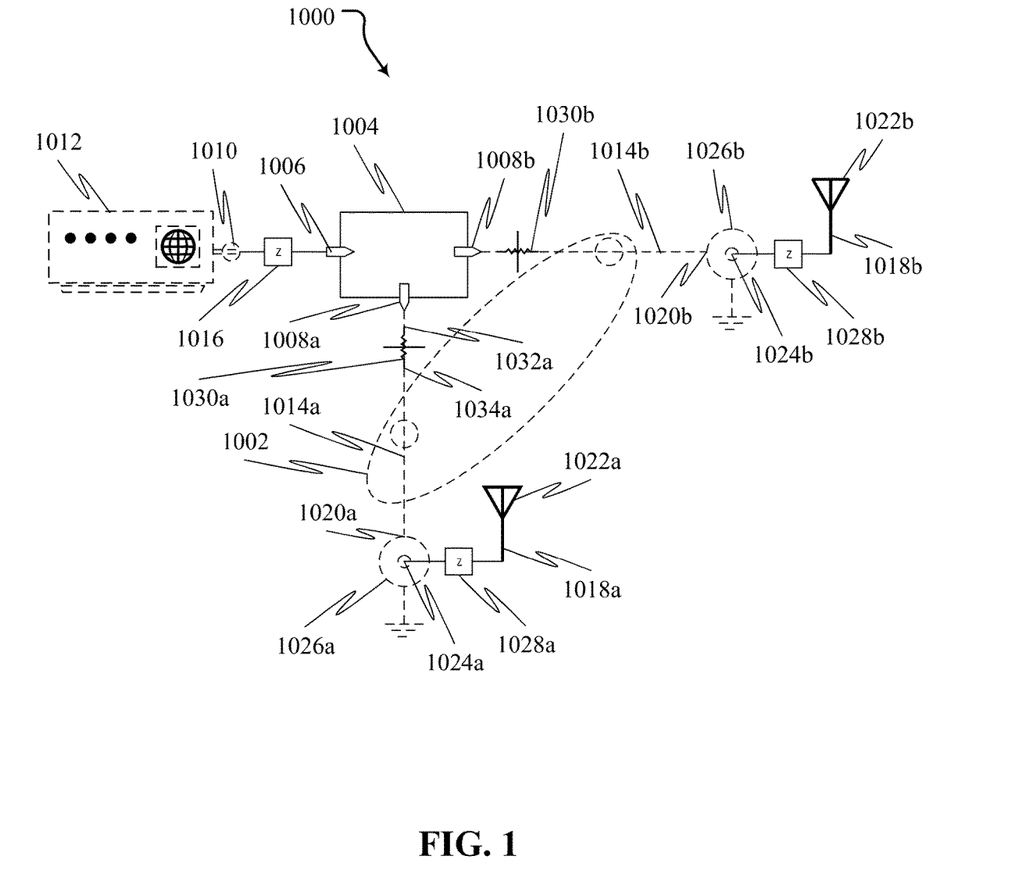
FIG. 1 illustrates deployment of a kit 1000 for facilitating transmission of wireless LAN radio signals over a pre-existing coaxial cable distribution network, wherein the kit 1000 comprises one or more attenuators configured to provide delay equalization and/or a predetermined common attenuation across a plurality of cables of the pre-existing coaxial cable distribution network, in accordance with some embodiments.

FIG. 1 illustrates deployment of a kit 1000 for facilitating transmission of wireless LAN radio signals over a pre-existing coaxial cable distribution network 1002, in accordance with some embodiments. Accordingly, the kit 1000 may include a splitter 1004 including at least one input port 1006 and a plurality of output ports 1008 (such as, for example, 1008a and 1008b). In some embodiments, the at least one input port 1006 may include a single input port. Further, in some embodiments, the plurality of output ports 1008 of the splitter 1004 may include one or more of two, three, and four output ports. In other words, in some embodiments, the splitter 1004 may be a 2-way splitter or a 3-way splitter or 4-way splitter. Further, the at least one input port 1006 may be configured to be communicatively coupled with at least one external antenna connector 1010 of a wireless LAN router 1012. Accordingly, in some embodiments, the at least one input port 1006 may include a splitter input connector configured to electrically and mechanically mate with the at least one external antenna connector 1010. Accordingly, in some embodiments, the splitter 1004 may be directly mounted onto the wireless LAN router 1012 by physically and electrically coupling the at least one input port 1006 with the at least one external antenna connector 1010. For example, in some embodiments, the at least one external antenna connector 1010 may be configured to connect with, for example, a WiFi dipole antenna. Accordingly, the at least one external connector 1010 may include a female connector (e.g. female SMA and/or RP-SMA connector). Accordingly, the at least one input port 1006 may include a male connector (e.g. male SMA and/or RP-SMA connector) configured to mate with the female connector. Alternatively, in some embodiments, the at least one input port 1006 may include a female connector (e.g. female SMA and/or RP-SMA connector). Accordingly, the kit 1000 may further include an interconnect cable comprising a male connector at each end of the interconnect cable. Accordingly, the interconnect cable may provide physical and electrical connectivity between the at least one external antenna connector 1010 and the at least one input port 1006.

Further, the plurality of output ports 1008 may be configured to be communicatively coupled to a plurality of cables 1014 (such as, for example, 1014a and 1014b) of the pre-existing coaxial cable distribution network 1002. In some embodiments, the plurality of output ports 1008 may include a plurality of splitter output connectors configured to electrically and mechanically mate with corresponding cable connectors of the plurality of cables 1014. For example, the plurality of splitter output connectors may include male connectors (e.g. male SMA and/or RP-SMA connectors) configured to mate with corresponding female connectors (e.g. female SMA and/or RP-SMA connectors) of the plurality of cables 1014. Alternatively, in some embodiments, the plurality of splitter output connectors may include female connectors (e.g. female SMA and/or RP-SMA connectors) configured to mate with corresponding male connectors (e.g. female SMA and/or RP-SMA connectors) of the plurality of cables 1014.

Further, the splitter 1004 may be configured to provide a plurality of bidirectional signal pathways between the at least one input port 1006 and the plurality of output ports 1008. Further, an operating frequency range of the plurality of bidirectional signal pathways may match at least one frequency band of the wireless LAN radio signals. In some embodiments, at least one channel of the wireless LAN radio signals may include a channel within one or more of the frequency ranges from 2.4 to 2.5 GHz and from 4.9 to 5.9 GHz. Accordingly, in some embodiments, the splitter may provide minimal attenuation (e.g., less than 0.5 dB) to the wireless LAN radio signals over each of the plurality of bidirectional signal pathways. Further, in some embodiments, each of the plurality of bidirectional signal pathways may offer a predetermined common attenuation. For example, in case of a 2-way splitter, each of the plurality of bidirectional signal pathways may offer approximately 3.5 dB attenuation.

Further, the kit 1000 may include a cable impedance matching unit 1016 coupled to the at least one external antenna connector 1010 of the wireless LAN router 1012. Further, the cable impedance matching unit 1016 may be configured to match an output port impedance of the at least one external antenna connector 1010 with a cable impedance of the plurality of cables 1014 as seen through the at least one input port 1006 of the splitter 1004. In other words, the cable impedance matching unit 1016 may be configured to match the output port impedance of the at least one external antenna connector 1010 with an input impedance of the at least one input port 1006 of the splitter. Accordingly, as depicted in FIG. 1, the cable impedance matching unit 1016 may be deployed between the at least one external antenna connector 1010 and the at least one input port 1006. Further, in some embodiments, the cable impedance matching unit 1016 may be integrated in the splitter 1004. Further, in some embodiments, the cable impedance matching unit 1016 may include a 50-ohm-SMA-to-75-ohm splitter cable assembly and a 50-ohm-SMA-to-75-ohm antenna assembly.

Further, the kit 1000 may include a plurality of antennas 1018 (such as, for example, 1018a and 1018b) corresponding to a plurality of terminal ends 1020 (such as, for example, 1020a and 1020b) of the pre-existing coaxial cable distribution network 1002. Further, an antenna 1018 of the plurality of antennas 1018 may include an antenna element 1022 (such as, for example, 1022a and 1022b) configured to perform wireless transmission and reception of the wireless LAN radio signals. Further, the antenna 1018 may include an antenna connector 1024 (such as, for example, 1024a and 1024b) configured to be communicatively coupled to a terminal connector 1026 (such as, for example, 1026a and 1026b) associated with a terminal end 1020 of the plurality of terminal ends 1020. For example, in some embodiments, the terminal connector 1026 may include a female connector (e.g. female F connector) comprised in, for instance, a CATV wall plate. Accordingly, the antenna connector 1024 may be a male connector (e.g. male F connector). As a result, the antenna 1018 may be directly plugged into the CATV wall plate. In some embodiments, the antenna 1018 may further include a flexible joint connected to the antenna element 1022. Further, the flexible joint may be configured to allow the antenna element 1022 to be positioned in one of a plurality of orientations. For example, subsequent to the antenna 1018 being physically and electrically coupled to the terminal connector 1026, the flexible joint may enable the antenna element 1022 to be positioned at one of a plurality of angles with respect to the ground.

Alternatively, in some embodiments, the kit 1000 may include an extension cable configured to interconnect the antenna 1018 to the CATV wall plate. Accordingly, the extension cable may include an interconnect configured to physically and electrically mate with the antenna connector 1024 and another interconnect configured to physically and electrically mate with the terminal connector 1026. As a result of providing the extension cable, in some embodiments, a user may place the antenna 1018 at a desired location, not necessarily proximal to the CATV wall plate.

Further, the antenna 1018 may include an antenna impedance matching unit 1028 (such as, for example, 1028a and 1028b) configured to match an antenna impedance of the antenna element 1022 with a cable impendence of the terminal connector 1026. In some embodiments, the antenna 1018 may include a 50-ohm dipole antenna. Further, the antenna connector 1024 may include a 75-ohm F-male connector as the cable impedance matching unit 1016. Accordingly, the terminal connector 1026 may include an F-female connector.

Further, the kit 1000 may include at least one attenuator 1030 (such as, for example, 1030a and 1030b). Further, a first end 1032 of at least one attenuator 1030 may be configured to be communicatively coupled to at least one output port 1008 of the plurality of output ports 1008. Further, a second end 1034 of the at least one attenuator 1030 may be configured to be communicatively coupled to at least one cable 1014 of the plurality of cables 1014. Further, the at least one attenuator 1030 may be configured to provide delay equalization and/or a predetermined common attenuation across the plurality of cables 1014. For instance, a length of cable 1014a may be substantially greater than a length of cable 1014b. As a result, an attenuation value and/or a delay value corresponding to the attenuator 1030b may be accordingly substantially greater than an attenuation value and/or a delay value corresponding to the attenuator 1030a in order to equalize signal levels at terminal 1026a and 1026b.

Further, in some embodiments, the at least one attenuator 1030 may be an adjustable attenuator. Accordingly, a user (such as a technician) may be enabled to vary an attenuation value corresponding to the at least one attenuator 1030 according to a desired degree of attenuation and/or delay to be presented along at least one corresponding cable 1014 of the plurality of cables 1014.

In some embodiments, the splitter 1004 may include a splitter pigtail cable assembly. Accordingly, an input port of the splitter pigtail cable assembly may include a 50-ohm-RP-SMA-male connector, to which may be crimped and soldered a plurality of wire conductors of a plurality of output cables with 75-ohm F-female connectors configured to mate at 75-ohm characteristic impedance with a plurality of F-male connectors corresponding to a plurality of cables 1014. Further, the plurality of cables 1014 may include RG-6 cables.

Figure 2:
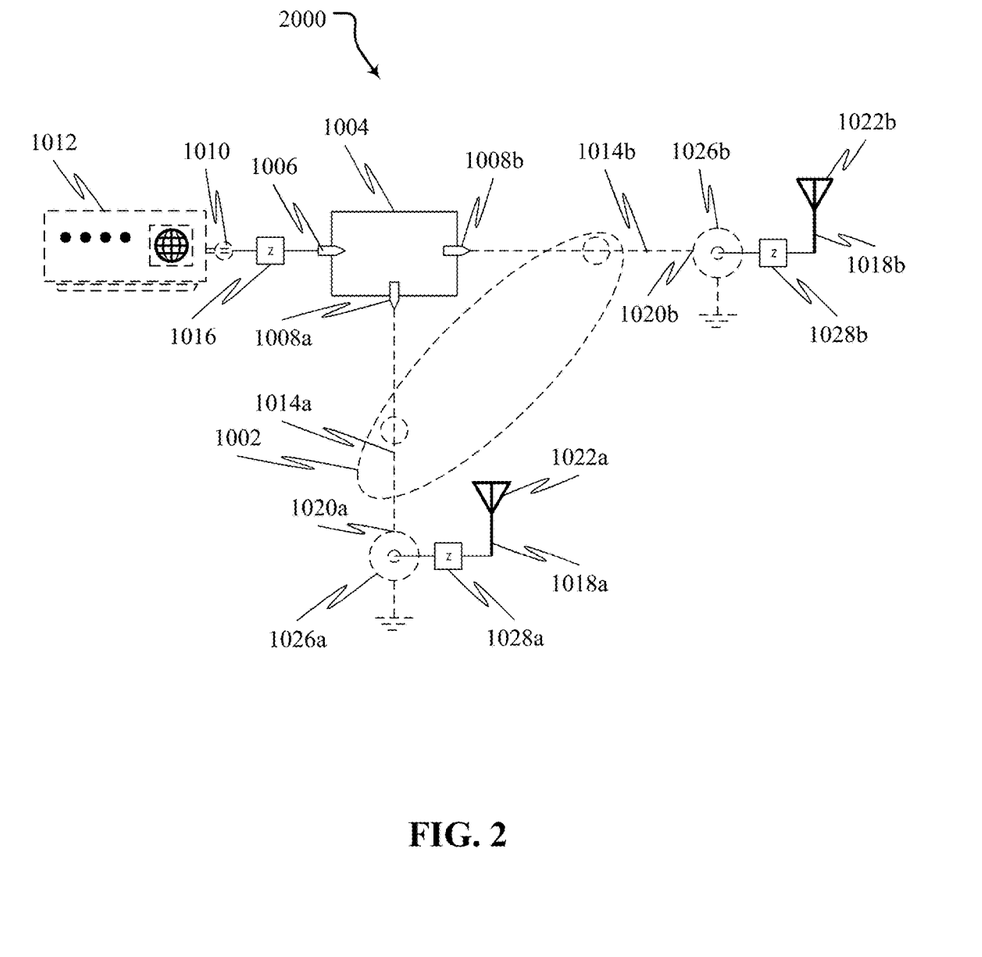
FIG. 2 illustrates deployment of a kit 2000 for facilitating transmission of wireless LAN radio signals over a pre-existing coaxial cable distribution network, wherein the kit 2000 comprises a cable impedance matching unit configured to match an output impedance corresponding to an external antenna connector of a wireless LAN router with an input impedance corresponding to an input port of a splitter, in accordance with some embodiments.

Turning to FIG. 2, a deployment of a kit 2000 for facilitating transmission of wireless LAN radio signals over a pre-existing coaxial cable distribution network, in accordance with some embodiments is illustrated. The kit may include the splitter 1004, the cable impedance matching unit 1016 and the plurality of antennas 1018. Further, the cable impedance matching unit 1016 may be configured to match the output port impedance of the at least one external antenna connector 1010 with an input impedance of the at least one input port 1006 of the splitter. Furthermore, each antenna 1018 may include the antenna impedance matching unit 1028 configured to match the antenna impedance of the antenna element 1022 with a cable impendence of the terminal connector 1026.

Figure 3:
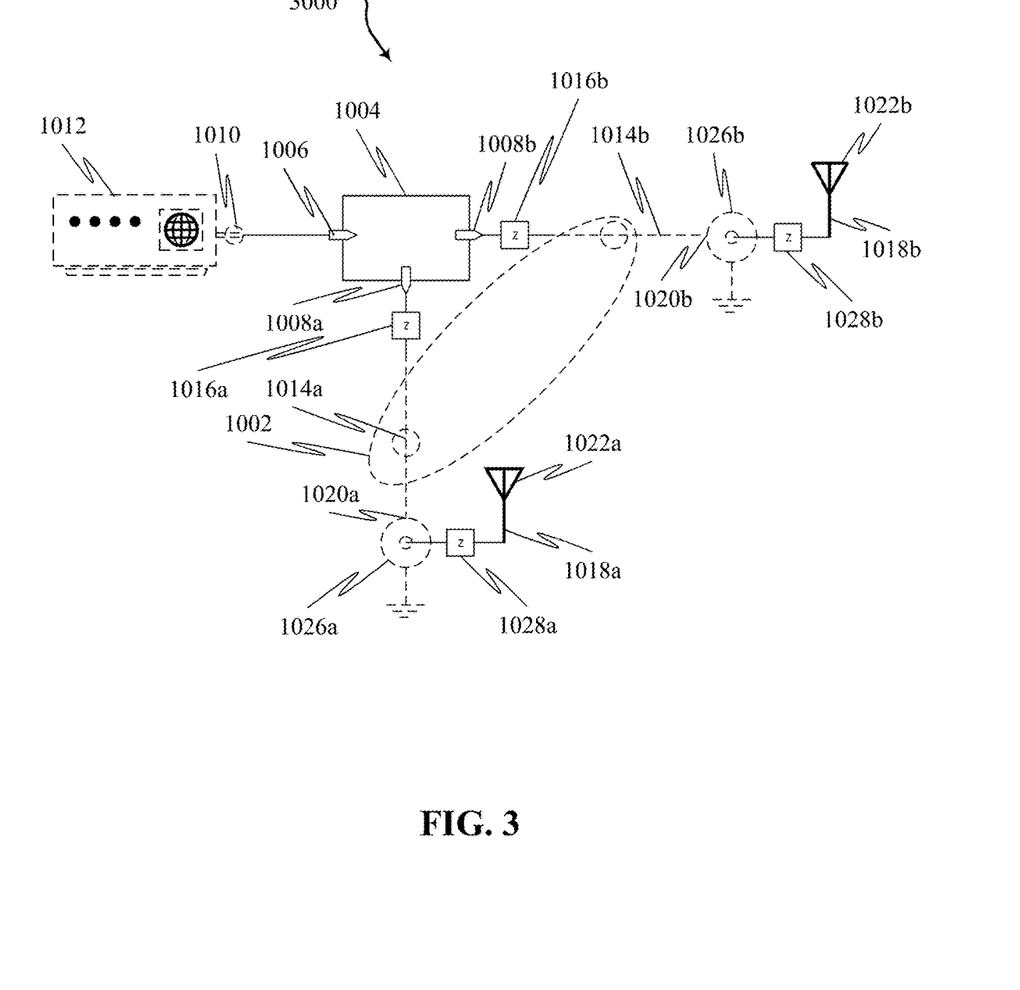
FIG. 3 illustrates deployment of a kit 3000 for facilitating transmission of wireless LAN radio signals over a pre-existing coaxial cable distribution network, wherein the kit 3000 comprises a plurality of cable impedance matching units configured to match an output impedance corresponding to an external antenna connector of a wireless LAN router with cable impedance corresponding to a plurality of cables of the pre-existing coaxial cable distribution network, in accordance with some embodiments.

Turning to FIG. 3, a deployment of a kit 3000 including a plurality of cable impedance matching units 1016 for facilitating transmission of wireless LAN radio signals over a pre-existing coaxial cable distribution network, in accordance with some embodiments is illustrated. Each of the plurality of cable impedance matching units 1016 (such as 1016a and 1016b) may be configured to match an output impedance corresponding to the at least one external antenna connector 1010 of the wireless LAN router 1012 with cable impedance corresponding to the plurality of cables 1014 (such as, for example, 1014a and 1014b) of the pre-existing coaxial cable distribution network 1002, in accordance with some embodiments. Accordingly, for example, the cable impedance matching unit 1016a may be deployed between the output port 1008a and an initial end of the cable 1014a. Likewise, the cable impedance matching unit 1016b may be deployed between the output port 1008b and an initial end of the cable 1014b. Further, in some embodiments, the plurality of cable impedance matching units 1016 may be integrated in the splitter 1004.

Figure 4:
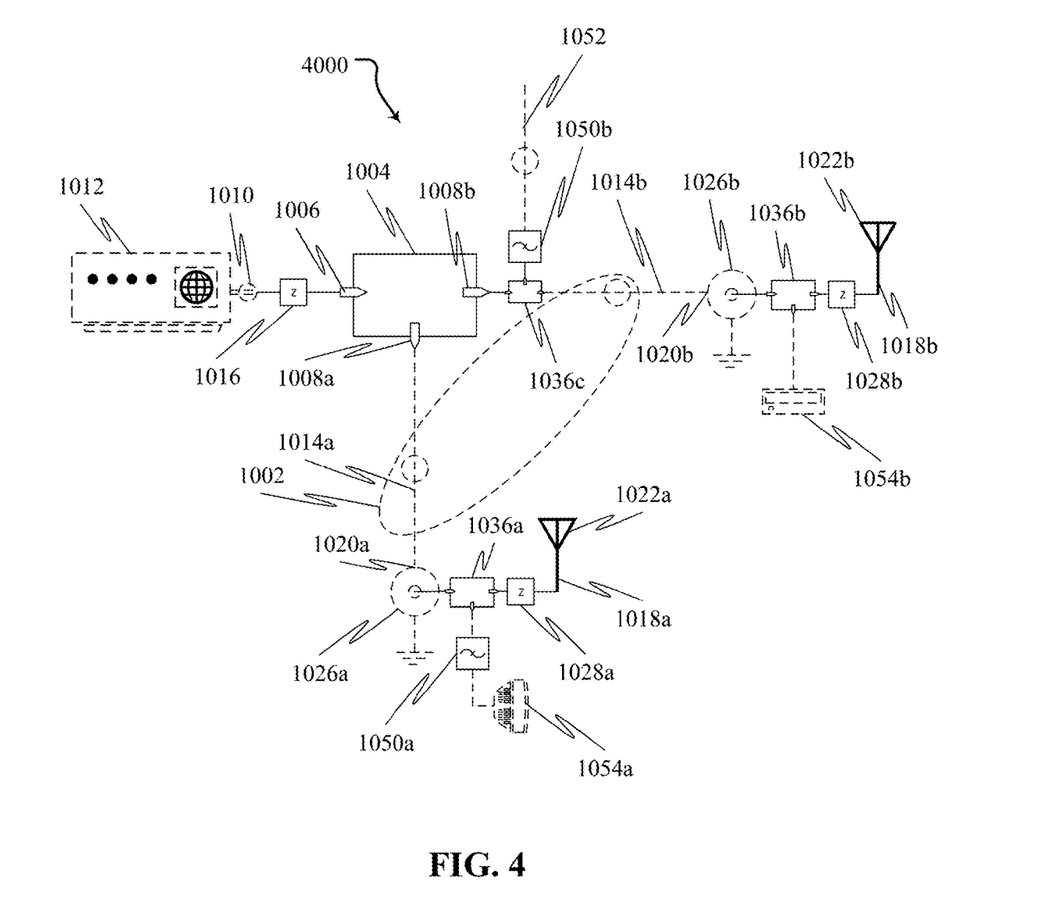
FIG. 4 illustrates deployment of a kit 4000 for facilitating transmission of wireless LAN radio signals over a pre-existing coaxial cable distribution network, wherein the kit 4000 comprises one or more diplexers and one or more point-of-entry filters, wherein the a diplexer is configured to enable connectivity to a client device such as, but not limited to, a television and a Multimedia over Coax Alliance (MoCA) modem in addition to an antenna configured to perform wireless transmission and reception of the wireless LAN radio signals, and wherein a point-of-entry filter is configured to prevent the wireless LAN radio signals from entering a feed line connecting the cable distribution network to an external access network, in accordance with some embodiments.

FIG. 4 illustrates deployment of a kit 4000 including one or more bidirectional diplexers 1036 and one or more point-of-entry filters 1050 for facilitating transmission of wireless LAN radio signals over a pre-existing coaxial cable distribution network, in accordance with some embodiments. For example, a bidirectional diplexer 1036a may be provided for enabling each of the antenna 1018a and a client device 1054 (such as a cable television receiver 1054a) to be communicatively coupled to the terminal connector 1026a. Accordingly, a user may be enabled to simultaneously use each of the client device 1054a and the antenna 1018a coupled to the terminal connector 1026a. Similarly, a bidirectional diplexer 1036b may be provided for enabling each of the antenna 1018b and a client device 1054b (such as a MoCA modem) to be communicatively coupled to the terminal connector 1026b. Accordingly, a user may be enabled to simultaneously use each of the client device 1054b and the antenna 1018b coupled to the terminal connector 1026b. Further, a bidirectional diplexer 1036c may be provided for coupling the cable distribution network 1002 and/or one or more cables 1014 to a feed line 1052 of an external access network, such, for example, but not limited to, a CATV network, while also simultaneously providing a signal pathway for the wireless LAN radio signals over the cable distribution network 1002 and/or the one or more cables 1014.

In some embodiments, a bidirectional diplexer 1036 may include a first F-female input port configured to operate at a frequency range of 2.4 to 2.5 GHz and 4.9 to 5.8 GHz. Further, the bidirectional diplexer 1036 may include a second F-female input port configured to operate at a frequency range of 5 MHz to 2,300 MHz. Further, the bidirectional diplexer 1036 may include an F-male output port configured to converge signals received on each of the first input port and the second input port.

Further, in some embodiments, the kit 4000 may further include one or more point-of-entry filters 1050. Further, in some embodiments, the one or more point-of-entry filters 1050 may be characterized by a pass band in the range of 5 to 1,002 MHz and a plurality of stop bands in the range of 1,125 to 1,675 MHz, 2.4 to 2.5 GHz, and 4.9 to 5.9 GHz.

For example, the kit 4000 may include a point-of-entry filter 1050a configured to be communicatively coupled between the bidirectional diplexer 1036a and the client device 1054 (such as CATV receiver 1054a). Accordingly, the point-of-entry filter 1050a may suppress passage of the wireless LAN radio signals from the cable distribution network 1002 into the client device 1054.

Additionally, in some embodiments, the kit 4000 may further include a point-of-entry filter 1050b configured to be communicatively coupled to a feed line 1052 connecting the cable distribution network to an external access network (not shown in figure). Further, the point-of-entry filter 1050b may be further configured to suppress passage of the wireless LAN radio signals from the cable distribution network 1002 into the external access network.

Figure 5:
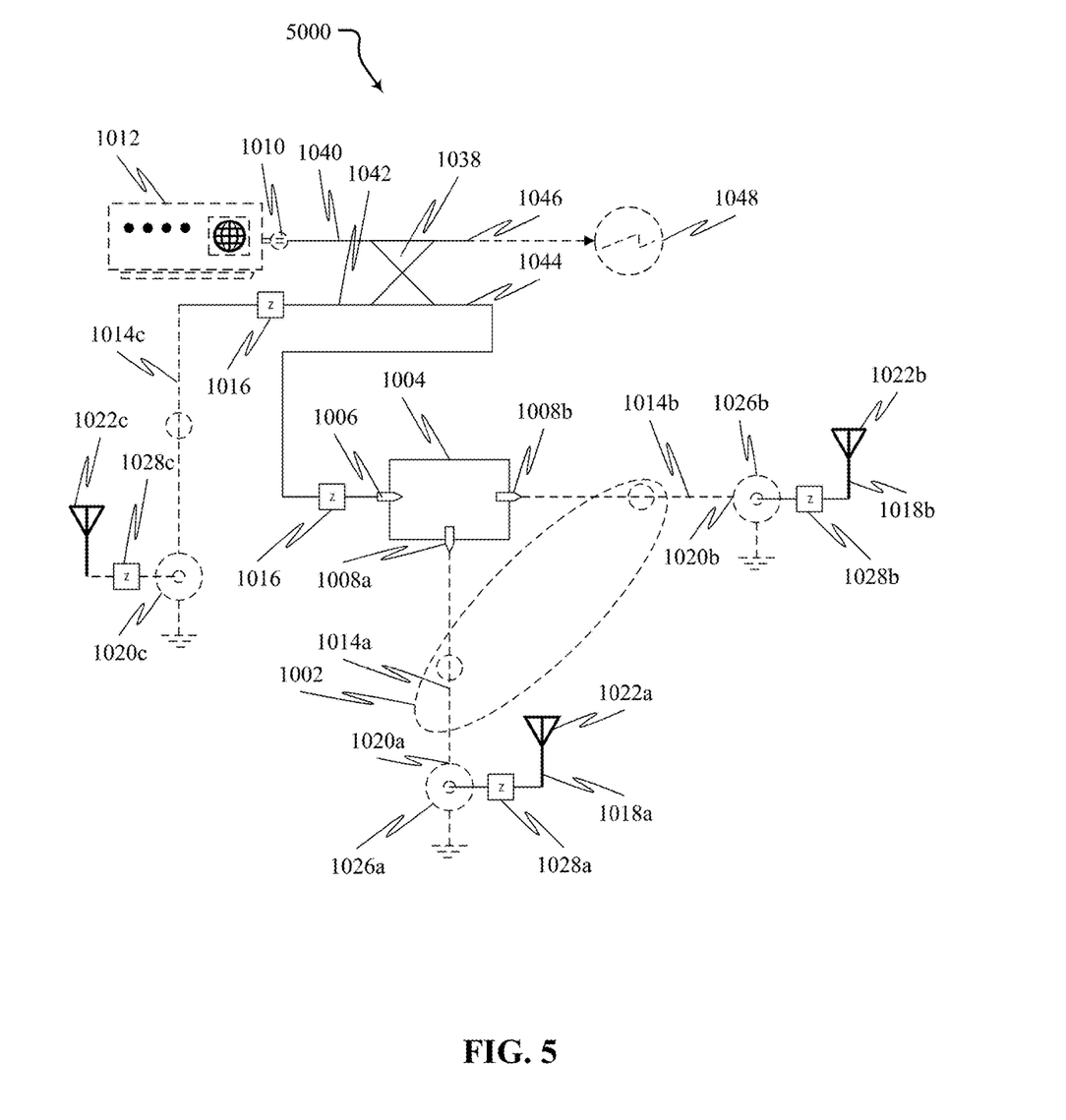
FIG. 5 illustrates deployment of a kit 5000 for facilitating transmission of wireless LAN radio signals over a pre-existing coaxial cable distribution network, wherein the kit 5000 comprises a directional coupler configured to be connected to an external antenna connector of a wireless LAN router, a splitter and a time-domain reflectometer, in accordance with some embodiments.

FIG. 5 illustrates deployment of a kit 5000 including a directional coupler 1038 for facilitating transmission of wireless LAN radio signals over a pre-existing coaxial cable distribution network, in accordance with some embodiments. Accordingly, an input port 1040 of the directional coupler 1038 may be configured to be communicatively coupled to the at least one external antenna connector 1010 of the wireless LAN router 1012. Further, an output port 1042 of the directional coupler 1038 may be configured to be communicatively coupled to an output cable 1014 of the plurality of cables 1014. Further, a coupling port 1044 of the directional coupler 1038 may be configured to be communicatively coupled to at least one input port 1006 of a plurality of splitters 1004. Further, a monitoring port 1046 of the directional coupler 1038 may be configured to be communicatively coupled to a time-domain reflectometer 1048 for measurement of signal reflection.

Exemplary Embodiments

The present disclosure provides, according to some embodiments, a low-cost in-building wireless (IBW) distributed antenna system (DAS) supporting currently available wireless LAN bands between the frequency ranges of 2.4 GHz and 5.9 GHz that can be installed in both residential and commercial buildings with pre-existing coaxial cabling and cable outlets, by way of an apparatus that uses signal splitters, resistive power dividers, diplexers, and filters. Connecting to a wireless LAN router with one or more external antennas, the apparatus improves wireless LAN signal propagation by distributing signals with potentially lower attenuation relative to fully wireless methods, while limiting interference to other signal sources communicating on the underlying coaxial cables.

Figure 6:
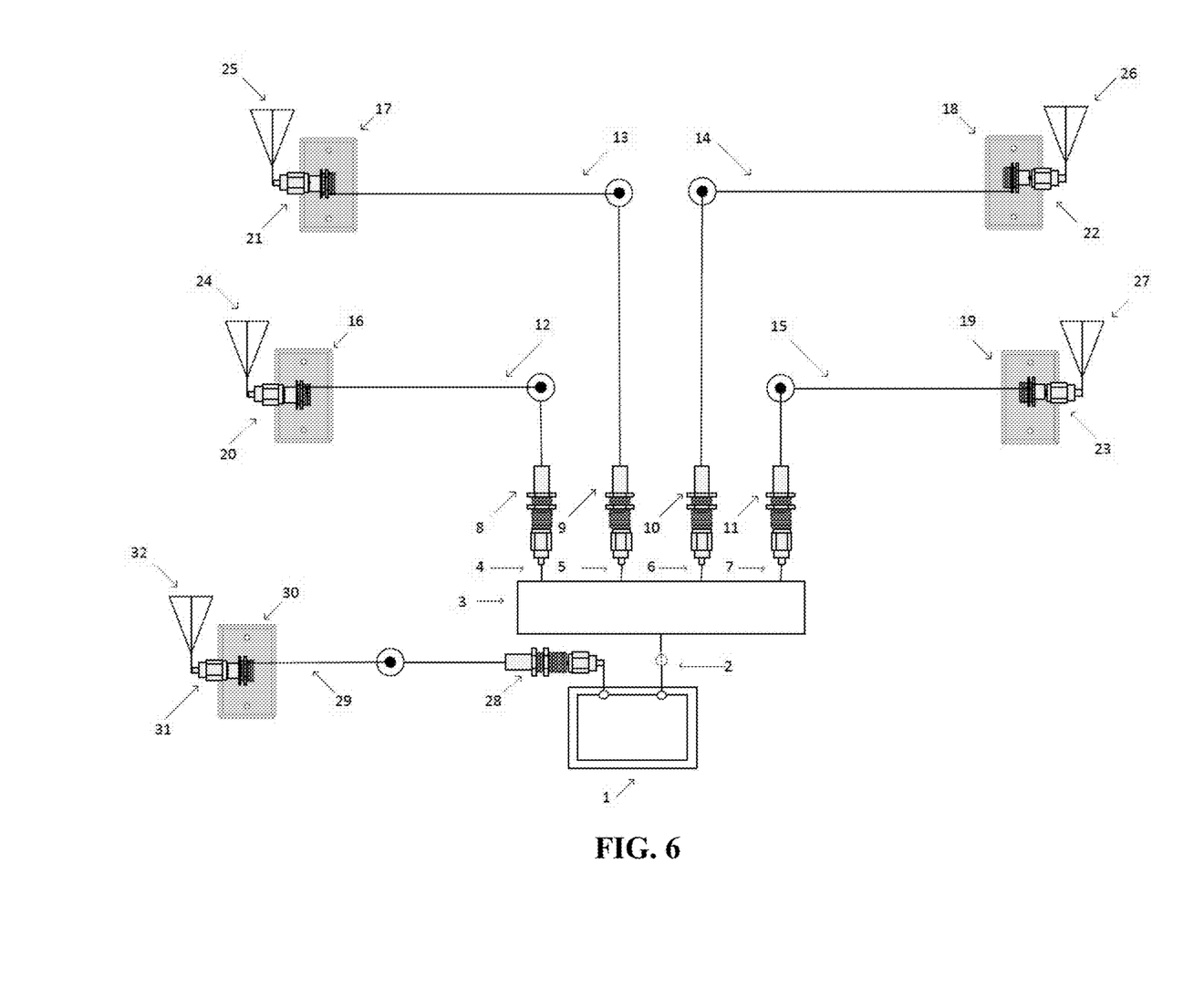
FIG. 6 is a diagram of functional components according to a first exemplary embodiment of the present disclosure, with a Wi-Fi router and a splitter/combiner shown connected at a central distribution point with structured coaxial cabling terminating at Wi-Fi antennas, in the absence of other signal sources.

In the first embodiment, a method of deploying an IBW DAS method for pre-existing 75-ohm structured coaxial cabling in the absence of coupled external signal sources is shown generally in FIG. 6. At a central distribution point of a building's existing 75-ohm structured coaxial cabling that is uncoupled from any external network(s), the RP-SMA-female connector of the external antenna connector of a wireless LAN router 1 placed at the central distribution point is uncoupled from the wireless LAN router's stock antenna and is coupled to a 50-ohm RP-SMA-male connector 2 of the input cable of a multi-way splitter/combiner 3 pigtail cable operating in the frequency ranges of 2.4-2.5 GHz and 4.9-5.9 GHz, for the transmission and reception of wireless LAN radio channels as specified by IEEE 802.11 protocols. The splitter/combiner pigtail cable comprises an input cable with a 50-ohm RP-SMA-male connector to which is crimped and soldered a plurality of wire conductors of a plurality of output cables with 75-ohm F-female connectors.

The splitter/combiner divides the radiated power and wireless LAN radio signals of the Wi-Fi router's antenna connector into four identical downstream signals at four output F-female connectors, each providing approximately one-fourth of the signal strength of the downstream signal applied at the Wi-Fi router's antenna connector. Each of the splitter/combiner's four output F-female connectors 4, 5, 6, and 7 are coupled to the F-male connectors 8, 9, 10, and 11 of a building's cabling runs, comprising individual pre-existing RG-6 cables 12, 13, 14, and 15 with two F-male connectors and providing 75 ohms of characteristic impedance.

The RG-6 cables comprising these cabling runs each originate at the central distribution point and terminate at individual rooms or offices in the building, and are each coupled to the in-wall F-female connector of individual pre-existing coaxial wall plates, each with a double-sided F-female barrel connector. To the exposed F-female connectors of each of these pre-existing coaxial wall plates 16, 17, 18, and 19 are coupled 75-ohm F-male connectors 20, 21, 22, and 23 of 50-ohm dipole antennas 24, 25, 26, and 27. Each antenna comprises a single integrated housing for a 75-ohm F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router.

As an alternative IBW DAS method in the same embodiment, an external antenna connector of the wireless LAN router may be coupled to a 50-ohm-RP-SMA-male-to-75-ohm F-female impedance converter 28, in turn coupled to the F-male connector of an individual pre-existing RG-6 cable 29 terminating with a second F-male connector coupled to a pre-existing coaxial wall plate with a double-sided F-female barrel connector 30. To the exposed F-female connector is coupled a 75-ohm F-male connector 31 of a 50-ohm dipole antenna 32. The antenna comprises a single integrated housing for a 75-ohm F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router.

Figure 7:
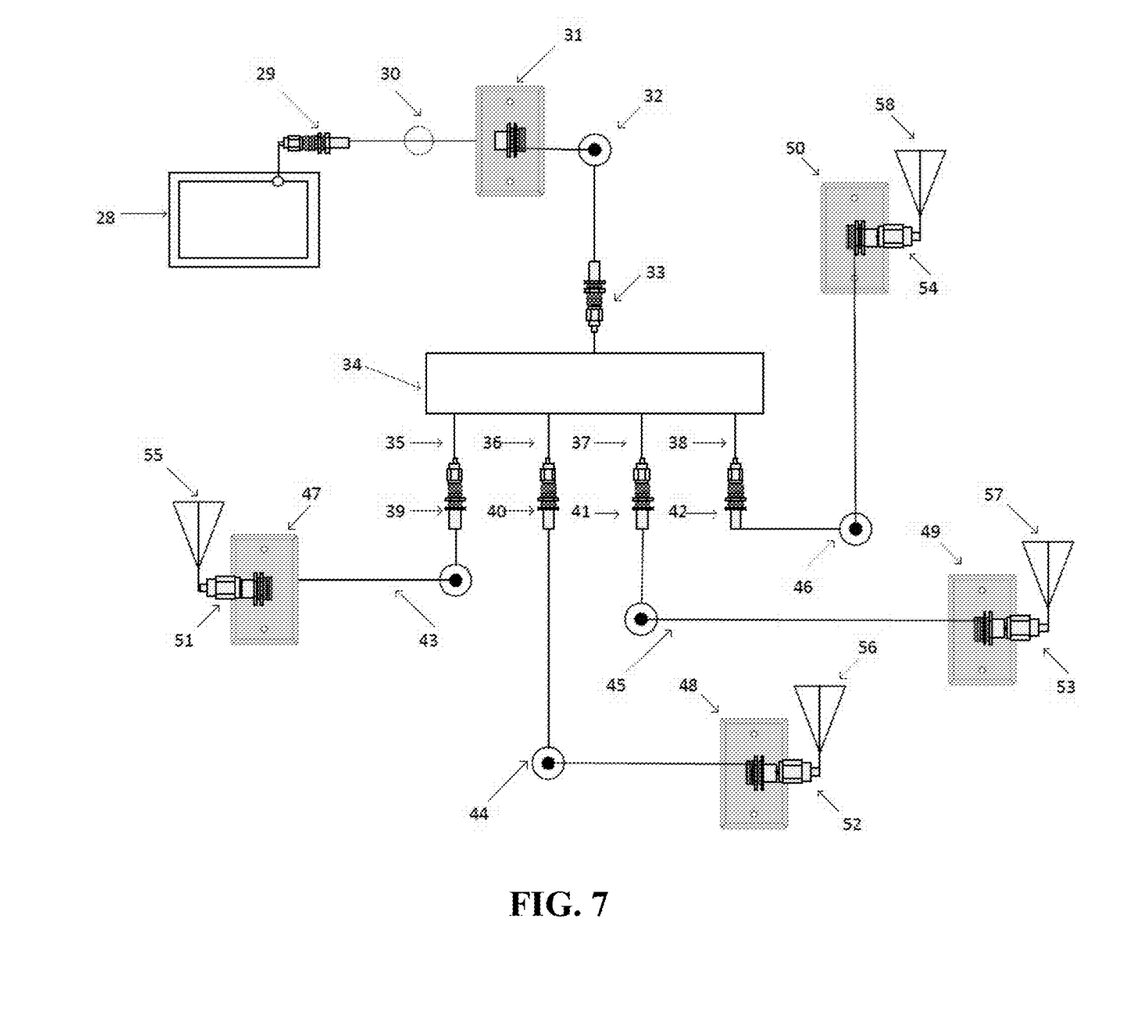
FIG. 7 is a diagram of functional components according to a second exemplary embodiment of the present disclosure, with a remote Wi-Fi router shown connected over structured coaxial cabling to a splitter/combiner at a central distribution point, with the network segment terminating at Wi-Fi antennas, in the absence of other signal sources.

In the second embodiment, an IBW DAS method for pre-existing 75-ohm structured coaxial cabling in the absence of coupled external signal sources, with a wireless LAN router placed remotely from the central distribution point, is shown generally in FIG. 7. The RP-SMA-female connector of the external antenna connector of a wireless LAN router 28 placed in a room, office, or common area is uncoupled from the wireless LAN router's stock antenna and is coupled to a 50-ohm RP-SMA-male-to-75-ohm F-female impedance converter 29, which is in turn coupled to an individual pre-existing RG-6 cable 30 with two F-male connectors that is terminated at a pre-existing coaxial wall plate 31 with a double-sided F-female barrel connector for an RG-6 cable 32 with F-male connectors and providing 75 ohms of impedance. This RG-6 cable runs to the central distribution point, where it is connected to the F-female connector 33 of the input cable of a 4-way splitter/combiner 34 pigtail cable operating in the frequency ranges of 2.4-2.5 GHz and 4.9-5.8 GHz, for the transmission and reception of wireless LAN radio channels as specified by IEEE 802.11 protocols. The splitter/combiner pigtail cable comprises an input cable with a 75-ohm F-female connector to which is crimped and soldered a plurality of wire conductors of a plurality of output cables with 75-ohm F-female connectors.

The splitter/combiner divides the radiated power and wireless LAN radio signals of the Wi-Fi router's antenna connector into four identical downstream signals at four output F-female connectors, each providing approximately one-fourth of the signal strength of the downstream signal applied at the Wi-Fi router's antenna connector. Each of the splitter/combiner's four output F-female connectors 35, 36, 37, and 38 are coupled to the F-male connectors 39, 40, 41, and 42 of individual RG-6 cables 43, 44, 45, and 46 providing 75 ohms of impedance. These RG-6 cables run from the central distribution point to individual rooms or offices in the house or commercial building, terminated at coaxial wall plates with F-female connectors 47, 48, 49, and 50. To these exposed F-female connectors are coupled 75-ohm F-male connectors 51, 52, 53, and 54 of 50-ohm dipole antennas 55, 56, 57, and 58. Each antenna comprises a single integrated housing for a 75-ohm-F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router.

Figure 8:
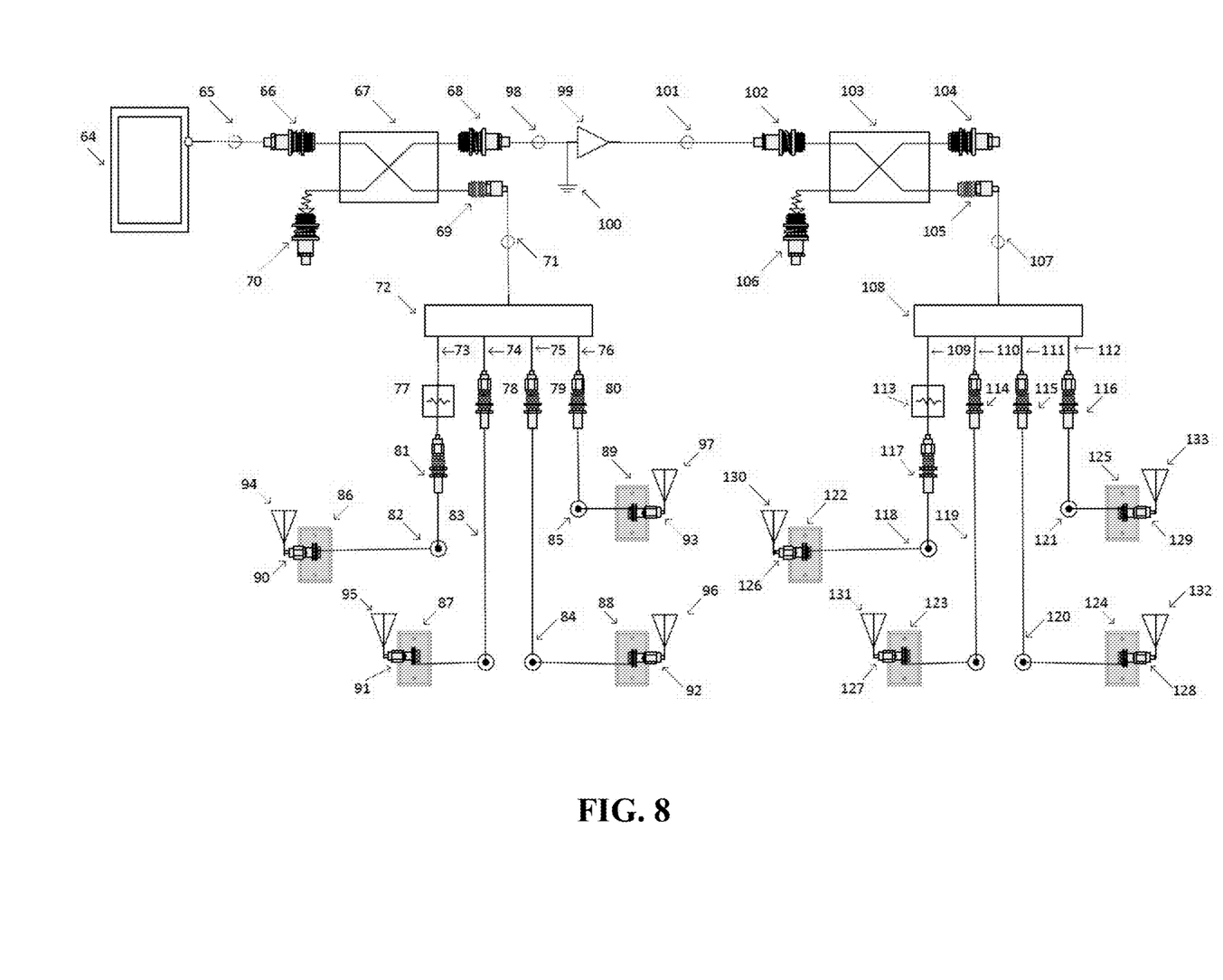
FIG. 8 is a diagram of functional components according to a third exemplary embodiment of the present disclosure, with a Wi-Fi router interconnected with a directional coupler, splitter/combiner, and structured coaxial cabling terminating at Wi-Fi antennas, with additional network segments interconnected via an amplifier and a directional coupler, in the absence of other signal sources.

In the third embodiment, an IBW DAS method over existing structured coaxial cabling in the absence of other signal sources, with a Wi-Fi router placed at a central distribution point and directional couplers and amplifiers connecting to structured cabling in remote buildings, is shown generally in FIG. 8. At a central distribution point in a building's structured coaxial cabling that is uncoupled from any external network(s), the RP-SMA-female connector of the external antenna connector of a wireless LAN router 64 is uncoupled from the wireless LAN router's stock antenna and is coupled to the RP-SMA-male connector of a 50-ohm cable 65 terminated with an F-male connector, which is in turn coupled to the F-female input port of a directional coupler 67 with predetermined coupling gain operating in the frequency bands of 2.4-2.5 GHz and 4.9-5.9 GHz, with connectors comprising an F-female input port 66 for coupling to a wireless LAN radio antenna port, an F-female output port 68, an F-male coupling port 69, and an F-female port 70 for monitoring signal reflection. The F-male coupled port of the directional coupler is coupled to the F-female connector of the input cable 71 of a multi-way splitter/combiner 72 pigtail cable operating in the frequency ranges of 2.4-2.5 GHz and 4.9-5.9 GHz, for the transmission and reception of wireless LAN radio channels as specified by IEEE 802.11 protocols. The splitter/combiner pigtail cable comprises an input cable with a 75-ohm F-female connector to which is crimped and soldered wire conductors of 4 output cables 73, 74, 75, and 76 with 75-ohm F-female connectors.

The splitter/combiner divides the radiated power and wireless LAN radio signals of the wireless LAN router's antenna port to the splitter/combiner's 4 output cables with 75-ohm F-female connectors, in turn coupled to the F-male connectors 78, 79, 80, and 81 of a building's cabling runs, comprising individual pre-existing RG-6 cables 82, 83, 84, and 85 with two F-male connectors and providing 75 ohms of characteristic impedance. The RG-6 cables comprising these cabling runs each originate at the central distribution point and terminate at individual rooms or offices in the building, and are each coupled to the in-wall F-female connectors of individual pre-existing coaxial wall plates 86, 87, 88, and 99, each with double-sided F-female barrel connectors. To the exposed F-female connectors of each of these pre-existing coaxial wall plates are coupled 75-ohm F-male connectors 90, 91, 92, and 93 of 50-ohm dipole antennas 94, 95, 96, and 97. Each antenna comprises a single integrated housing for a 75-ohm F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router.

To equalize signal delay between the DAS antennas, an attenuator 77 with a predetermined common attenuation may be added between one of the splitter/combiner's F-female output cables and the F-male connector 81 of an individual pre-existing RG-6 cable 82 running from the central distribution point to the nearest individual room, office, or common area in the residence or building structure.

To increase the radiated power of the wireless LAN radio signal for additional propagation beyond the directional coupler and splitter/combiner, an F-male-to-SMA-male patch cable 98 may be coupled between the F-female output port 68 of the directional coupler and the SMA-female input port of a 1-watt amplifier 99 with predetermined radiated power gain operating in the frequency bands of 2.4-2.5 GHz and 4.9-5.9 GHz and powered by a connected alternating-current adapter 100 drawing electricity from a pre-existing electrical outlet at the residence or building structure, with the RP-SMA-female output port of the amplifier coupled to an 50-ohm RP-SMA-male-to-F-male cable 101, in turn coupled to the F-female input port of an additional directional coupler with predetermined coupling gain operating in the frequency bands of 2.4-2.5 GHz and 4.9-5.9 GHz, with connectors comprising an F-female input port 102 for coupling to a wireless LAN radio antenna port, an F-female output port 104, an F-male coupled port 105, and an F-female port 106 for monitoring signal reflection. The F-male coupled port of the directional coupler is coupled to the F-female connector of the input cable 107 of a multi-way splitter/combiner 108 pigtail cable operating in the frequency ranges of 2.4-2.5 GHz and 4.9-5.9 GHz, for the transmission and reception of wireless LAN radio channels as specified by IEEE 802.11 protocols. The splitter/combiner pigtail cable comprises an input cable with a 75-ohm F-female connector to which is crimped and soldered wire conductors of 4 output cables 109, 110, 111, and 112 with 75-ohm F-female connectors.

The splitter/combiner divides the radiated power and wireless LAN radio signals of the wireless LAN router's antenna port to the splitter/combiner's 4 output cables with 75-ohm F-female connectors, in turn coupled to the F-male connectors 114, 115, 116, and 117 of a building's cabling runs, comprising individual pre-existing RG-6 cables 118, 119, 120, and 121 with two F-male connectors and providing 75 ohms of characteristic impedance. The RG-6 cables comprising these cabling runs each originate at the central distribution point and terminate at individual rooms or offices in the building, and are each coupled to the in-wall F-female connectors of individual pre-existing coaxial wall plates 122, 123, 124, and 125, each with double-sided F-female barrel connectors. To the exposed F-female connectors of each of these pre-existing coaxial wall plates are coupled 75-ohm F-male connectors 126, 127, 128, and 129 of 50-ohm dipole antennas 130, 131, 132, and 133. Each antenna comprises a single integrated housing for a 75-ohm F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router.

To equalize signal delay between the DAS antennas, an attenuator 113 with a predetermined common attenuation may be added between one of the splitter/combiner's F-female output cables and the F-male connector 117 of an individual pre-existing RG-6 cable 118 running from the central distribution point to the nearest individual room, office, or common area in the residence or building structure.

A plurality of additional directional couplers, amplifiers, splitter/combiners, and attenuators may be coupled as needed to propagate wireless LAN radio signals to additional building floors and structures, or to satisfy a predetermined pass criterion with regard to terminal signal propagation and signal-to-noise ratios.

Figure 9:
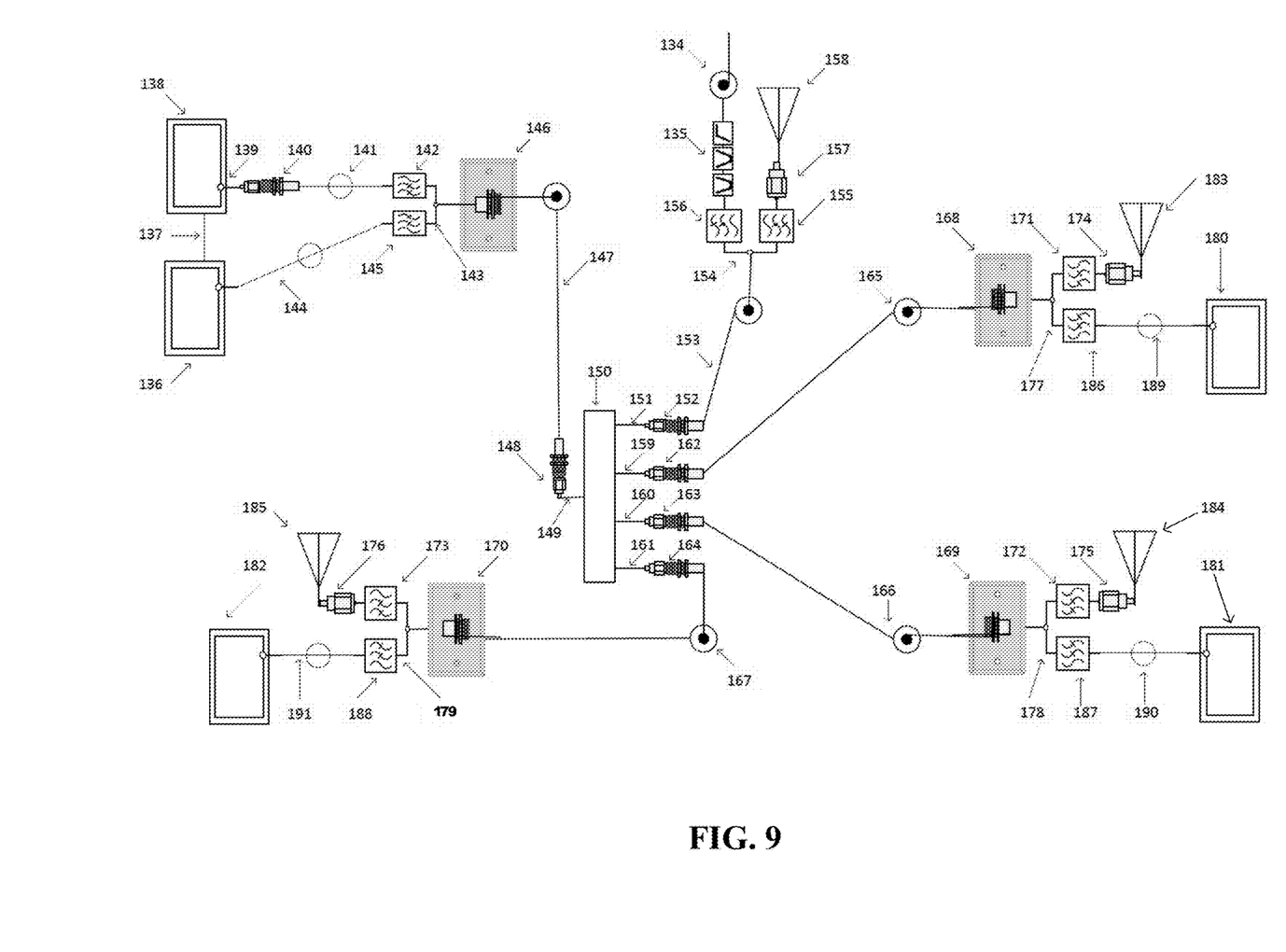
FIG. 9 is a diagram of functional components of the fourth exemplary embodiment of the invention, with a Wi-Fi router and cable gateway device shown connected over structured coaxial cabling to a splitter/combiner and array of diplexers with interconnected Wi-Fi antennas and MoCA client devices, and also showing components of a wide-area network or video delivery infrastructure.

In the fourth embodiment, an IBW DAS method for pre-existing 75-ohm structured coaxial cabling coupled with signal sources from external access networks, with a wireless LAN router placed remotely from the central distribution point, is shown generally in FIG. 9. A pre-existing 75-ohm coaxial feed line 134 connecting to a wide-area network or video delivery infrastructure potentially comprising one or more of a plurality of community antenna TV (CATV) signals, cable-modem termination system (CMTS) signals, terrestrial over-the-air (OTA) television broadcast signals, and Multimedia over Coax Alliance (MoCA) signals, is present at the building's minimum point of entry. The F-male connector of the RG-6 feed line is coupled to the F-female connector of a point-of-entry filter 135, consisting of a CATV/CMTS/OTA pass-band filter at a frequency range of 5-1002 MHz, a MoCA stop-band filter at 1125-1675 MHz, and wireless LAN stop-band filters at 2.4-2.5 GHz and 4.9-5.9 GHz. The point-of-entry filter prevents the ingress of MoCA and wireless LAN radio frequencies into external access networks coupled via the 75-ohm coaxial feed line.

At a remote room, office, or common area, a pre-existing Ethernet-enabled optical network terminal (ONT) or cable gateway device 136 potentially integrating one or more of a plurality of components comprising a cable modem, tuned video-signal receiver, MoCA controller, and/or digital video recorder (DVR) tuner, is coupled via an Ethernet cable 137 with dual 8P8C connectors attached to an Ethernet LAN port of the ONT or cable gateway device and an Ethernet WAN port of a wireless LAN router 138. The RP-SMA-female connector of the external antenna connector 139 of a wireless LAN router is uncoupled from the wireless LAN router's stock antenna and is coupled to a 50-ohm-RP-SMA-male-to-75-ohm F-female impedance converter 140, which is in turn coupled to an RG-6 cable 141 with two F-male connectors that is terminated at the F-female 2.4-2.5 GHz/4.9-5.9 GHz input port 142 of the first of a plurality of bidirectional diplexers 143, while the cable gateway device is coupled via a second F-male-to-F-male RG-6 cable 144 to the F-female 5 MHz-2300 MHz input port 145 of the bidirectional diplexer. Each bidirectional diplexer comprises an F-female 5 MHz-2300 MHz input port, an F-female 2.4-2.5 GHz/4.9-5.9 GHz input port, an F-male output port on which signals from both input ports are converged, a printed circuit board for forming a diplexer circuit, and a hardened case housing the diplexer components. The F-male output port of the bidirectional diplexer is coupled to the exposed F-female connector of a pre-existing coaxial wall plate 146 with a double-sided F-female barrel connector, which is coupled to an individual pre-existing RG-6 cable 147 with two F-male connectors providing 75 ohms of characteristic impedance. This RG-6 cable runs to the central distribution point, where it is coupled to the F-female connector 148 of the input cable 149 of a multi-way splitter/combiner pigtail cable operating in the frequency range of 5 MHz-6 GHz.

The splitter/combiner pigtail cable comprises an input cable with a 75-ohm F-female connector to which is crimped and soldered a plurality of wire conductors of a plurality of output cables with 75-ohm F-female connectors. The splitter/combiner divides the radiated power of the wireless LAN router's antenna port, and the converged signals of the wireless LAN radio and a plurality of CATV, CMTS, OTA, and/or MoCA sources, to the splitter/combiner's plurality of output cables with 75-ohm F-female connectors, each in turn coupled to the F-male connectors of a building's cabling runs, comprising individual pre-existing RG-6 cables with two F-male connectors and providing 75 ohms of characteristic impedance. The RG-6 cables comprising these cabling runs each originate at the central distribution point and terminate at individual rooms or offices in the building, and are each coupled to the in-wall F-female connector of individual pre-existing coaxial wall plates, each with a double-sided F-female barrel connector.

The first output port 151 of the splitter/combiner is coupled to the F-male output port of a second bidirectional diplexer 154 with a 2.4-2.5 GHz/4.9-5.9 GHz input port 155 and 5 MHz-2300 MHz input port 156. To the 2.4-2.5 GHz/4.9-5.9 GHz input port of the second diplexer is coupled a 75-ohm F-male connector 157 of a 50-ohm dipole antenna 158. The antenna comprises a single integrated housing for a 75-ohm F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router. At the 5 MHz-2300 MHz input port 156 of the second diplexer, the point-of-entry filter 135 is connected. The second, third, and fourth output ports 159, 160, and 161 of the splitter/combiner each couple via F-male connectors 162, 163, and 164 of F-male-to-F-male RG-6 cables 165, 166, and 167 to the F-female-to-F-female barrel connectors of coaxial wall plates 168, 169, and 170. Coupled to the exposed F-female connector of each coaxial wall plate is the F-male output port of a third, fourth, and fifth bidirectional diplexer 177, 178, and 179 with 2.4-2.5 GHz/4.9-5.9 GHz input ports 171, 172, and 173 and 5 MHz-2300 MHz input ports 186, 187, and 188. To the 2.4-2.5 GHz/4.9-5.9 GHz input port of each diplexer are coupled 75-ohm F-male connectors 174, 175, and 176 of 50-ohm dipole antennas 183, 184, and 185. Each antenna comprises a single integrated housing for a 75-ohm F-male connector, a flexible joint between the connector and antenna components allowing the antenna component to be positioned in a plurality of orientations, and a dipole antenna with a flexible joint between the connector and antenna components, with the antenna operating in the frequency ranges of 2.4-2.5 GHz and 4.9-5.9 GHz in correspondence with the wireless LAN router. F-male to F-male RG-6 cables 189, 190, and 191 are coupled to the 5 MHz-2300 MHz input ports 186, 187, and 188 of each diplexer, in turn connected to the F-female input ports of each of a plurality of MoCA client devices 180, 181, and 182 receiving television and/or data signals from the ONT or cable gateway device.

If the transmission and reception of either MoCA or wireless LAN radio signals is not required at a given pre-existing coaxial wall plate that is coupled to an RG-6 cabling run and one of a plurality of additional output ports of the splitter/combiner, there may instead be coupled an additional point-of-entry filter, consisting of a CATV/CMTS/OTA pass-band filter at a frequency range of 5-1002 MHz, a MoCA stop-band filter at 1125-1675 MHz, and wireless LAN stop-band filters at 2.4-2.5 GHz and 4.9-5.9 GHz. This additional point-of-entry filter may be used to transmit CATV/CMTS/OTA signals within the pass-band frequency range to coupled cables and devices, while rejecting MoCA and wireless LAN radio signals at the stop-band frequency ranges.

Figure 10:
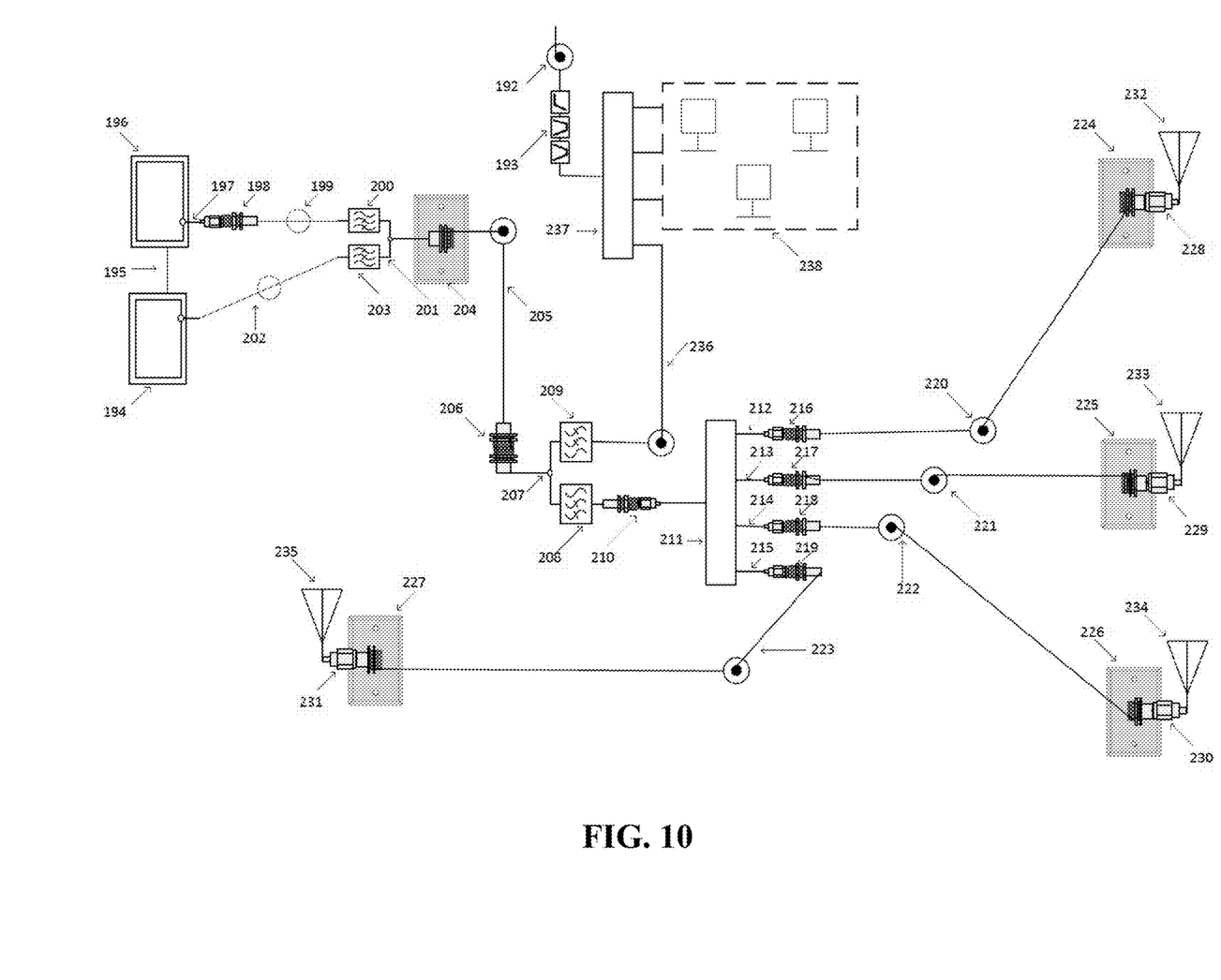
FIG. 10 is a diagram of functional components of the fifth exemplary embodiment of the invention, with a Wi-Fi router and cable gateway device shown connected over structured coaxial cabling to a diplexer and splitter/combiner to Wi-Fi antennas, and also showing components of a wide-area network or video delivery infrastructure.

In the fifth embodiment, an IBW DAS method over existing structured coaxial cabling while integrated with signal sources from other access networks, with a Wi-Fi router placed remotely from the central distribution point, is shown generally in FIG. 10. A coaxial feed line 192 connecting to a wide-area network or video delivery infrastructure, including CATV, CMTS, DBS, MoCA, OTA, or PON, is present at the building's minimum point of entry. The feed line is connected to a point-of-entry filter 193, consisting of a CATV/CMTS/OTA band-pass filter at a frequency range of 5-1002 MHz, a MoCA band-stop filter at 1125-1675 MHz, and wireless LAN stop-band filters at 2.4-2.5 GHz and 4.9-5.9 GHz. The point-of-entry filter prevents the ingress of MoCA and wireless LAN radio frequencies into external access networks coupled via the 75-ohm coaxial feed line.

At a remote room, office, or common area, a pre-existing Ethernet-enabled optical network terminal (ONT) or cable gateway device 194 potentially integrating one or more of a plurality of components comprising a cable modem, tuned video-signal receiver, MoCA controller, and/or digital video recorder (DVR) tuner, is coupled via an Ethernet cable 195 with dual 8P8C connectors attached to an Ethernet LAN port of the ONT or cable gateway device and an Ethernet WAN port of a wireless LAN router 196. The RP-SMA-female connector of the external antenna connector 197 of a wireless LAN router is uncoupled from the wireless LAN router's stock antenna and is coupled to a 50-ohm-RP-SMA-male-to-75-ohm F-female impedance converter 198, which is in turn coupled to an RG-6 cable 199 with two F-male connectors that is terminated at the F-female 2.4-2.5 GHz/4.9-5.9 GHz input port 200 of the first of a plurality of bidirectional diplexers 201, while the cable gateway device is coupled via a second F-male-to-F-male RG-6 cable 202 to the F-female 5 MHz-2300 MHz input port 203 of the bidirectional diplexer. Each bidirectional diplexer comprises an F-female 5 MHz-2300 MHz input port, an F-female 2.4-2.5 GHz/4.9-5.9 GHz input port, an F-male output port on which signals from both input ports are converged, a printed circuit board for forming a diplexer circuit, and a hardened case housing the diplexer components. The F-male output port of the bidirectional diplexer is coupled to the exposed F-female connector of a pre-existing coaxial wall plate 204 with a double-sided F-female barrel connector, which is coupled to an individual pre-existing RG-6 cable 205 with two F-male connectors providing 75 ohms of characteristic impedance. This RG-6 cable runs to the central distribution point, where it is coupled to an F-female-to-F-female barrel connector 206, which is in turn connected to the F-male output port 207 of a second bidirectional diplexer. The F-female 5 MHz-2300 MHz input port 209 of the second bidirectional diplexer is coupled to an F-male-to-F-male RG-6 cable 236 terminating at a multi-way bi-directional splitter 237 operating in the frequency range of 5-2300 MHz for signal delivery to an array 238 of television sets, ATSC/HDTV receivers, digital transport adapters, quadrature amplitude modulation-based receivers, and MoCA-based multimedia devices throughout the house or office. The multi-port bi-directional splitter is connected to the point-of-entry filter 193.

The F-female 2.4-2.5 GHz/4.9-5.9 GHz input port 208 of the second bidirectional diplexer is coupled via an F-male-to-F-male barrel connector 210 to the F-female connector of an input cable of a 4-way splitter/combiner 34 pigtail cable operating in the frequency ranges of 2.4-2.5 GHz and 4.9-5.8 GHz, for the transmission and reception of wireless LAN radio channels as specified by IEEE 802.11 protocols. The splitter/combiner pigtail cable comprises an input cable with a 75-ohm F-female connector to which is crimped and soldered a plurality of wire conductors of a plurality of output cables with 75-ohm F-female connectors.

The splitter/combiner divides the radiated power and wireless LAN radio signals of the Wi-Fi router's antenna connector into four identical downstream signals at four output F-female connectors, each providing approximately one-fourth of the signal strength of the downstream signal applied at the Wi-Fi router's antenna connector. Each of the splitter/combiner's four output F-female connectors 212, 213, 214, and 215 are coupled to the F-male connectors 216, 217, 218, and 219 of individual RG-6 cables 220, 221, 222, and 223 providing 75 ohms of impedance. These RG-6 cables run from the central distribution point to individual rooms or offices in the house or commercial building, terminated at coaxial wall plates with F-female connectors 224, 225, 226, and 227. To these exposed F-female connectors are coupled 75-ohm F-male connectors 228, 229, 230, and 231 of 50-ohm dipole antennas 232, 233, 234, and 235. Each antenna comprises a single integrated housing for a 75-ohm-F-male connector, a flexible joint between the connector and antenna components allowing the antenna component to be positioned in a plurality of orientations, and the dipole antenna, with the antenna operating in the frequency ranges of 2.4-2.5 GHz and 4.9-5.9 GHz in correspondence with the wireless LAN router.

It will be appreciated that various above-disclosed embodiments, other features, and functions, or alternatives thereof, may be desirably combined into many other different systems or applications. Various presently unforeseen or unanticipated alternatives, modifications, variations, or improvements therein may be subsequently made by those skilled in the art.

I claim:

1. A kit for facilitating transmission of wireless local-area network (LAN) radio signals over a pre-existing coaxial cable distribution network, the kit comprising:
   a splitter comprising at least one input port and a plurality of output ports, wherein the at least one input port is configured to be communicatively coupled with at least one external antenna connector of a wireless LAN router, wherein the plurality of output ports is configured to be communicatively coupled to a plurality of cables of the cable distribution network, wherein the splitter is configured to provide a plurality of bidirectional signal pathways between the at least one input port and the plurality of output ports, wherein an operating frequency range of the plurality of bidirectional signal pathways matches at least one frequency band of the wireless LAN radio signals;
   a cable impedance matching unit coupled to the at least one external antenna connector of the wireless LAN router, wherein the cable impedance matching unit is configured to match an output port impedance of the at least one external antenna connector with a cable impedance of the plurality of cables;
   at least one attenuator, wherein a first end of at least one attenuator is configured to be communicatively coupled to at least one output port of the plurality of output ports, wherein a second end of the at least one attenuator is configured to be communicatively coupled to at least one cable of the plurality of cables, wherein the at least one attenuator is configured to provide delay equalization and a predetermined common attenuation across the plurality of cables; and
   a plurality of antennas corresponding to a plurality of terminal ends of the cable distribution network, wherein an antenna of the plurality of antennas comprises:
      an antenna element configured to perform wireless transmission and reception of the wireless LAN radio signals;
      an antenna connector configured to be communicatively coupled to a terminal connector associated with a terminal end of the plurality of terminal ends; and
      an antenna impedance matching unit configured to match an antenna impedance of the antenna element with a cable impendence of the terminal connector.

2. The kit of claim 1, wherein the splitter comprises a splitter pigtail cable assembly, wherein an input port of the splitter pigtail cable assembly comprises a 50-ohm-RP-SMA-male connector, to which is crimped and soldered a plurality of wire conductors of a plurality of output cables with 75-ohm F-female connectors configured to mate at 75-ohm characteristic impedance with a plurality of F-male connectors corresponding to a plurality of cables, wherein the plurality of cables comprises RG-6 cables.

3. The kit of claim 1, wherein each of the plurality of bidirectional signal pathways offers a predetermined common attenuation.

4. The kit of claim 1, wherein the plurality of output ports of the splitter comprises at least one of two, three, and four output ports.

5. The kit of claim 1, wherein at least one channel of the wireless LAN radio signals comprises a channel within at least one of the frequency ranges from 2.4 to 2.5 GHz and from 4.9 to 5.9 GHz.

6. The kit of claim 1, wherein the cable impedance matching unit comprises a 50-ohm-SMA-to-75-ohm splitter cable assembly and a 50-ohm-SMA-to-75-ohm antenna assembly.

7. The kit of claim 1, wherein the antenna further comprises a flexible joint connected to the antenna element, wherein the flexible joint is configured to allow the antenna element to be positioned in one of a plurality of orientations.

8. The kit of claim 1, wherein the antenna comprises a 50-ohm dipole antenna, wherein the antenna connector comprises a 75-ohm F-male connector as the cable impedance matching unit, wherein the terminal connector comprises an F-female connector.

9. The kit of claim 1 further comprising a directional coupler, wherein an input port of the directional coupler is configured to be communicatively coupled to the at least one external antenna connector of the wireless LAN router, wherein an output port of the directional coupler is configured to be communicatively coupled to an output cable, wherein a coupling port of the directional coupler is configured to be communicatively coupled to at least one input port of a plurality of splitters, wherein a monitoring port of the directional coupler is configured to be communicatively coupled to a time-domain reflectometer for measurement of signal reflection.

10. A kit for facilitating transmission of wireless LAN radio signals over a pre-existing coaxial cable distribution network, the kit comprising:

a splitter comprising at least one input port and a plurality of output ports, wherein the at least one input port is configured to be communicatively coupled with at least one external antenna connector of a wireless LAN router, wherein the plurality of output ports is configured to be communicatively coupled to a plurality of cables of the cable distribution network, wherein the splitter is configured to provide a plurality of bidirectional signal pathways between at least one input port and the plurality of output ports, wherein an operating frequency range of the plurality of bidirectional signal pathways matches at least one frequency band of the wireless LAN radio signals;

a cable impedance matching unit configured to be communicatively coupled with at least one external antenna connector of a wireless LAN router and is configured to match an output port impedance of the at least one external antenna connector with a cable impedance of the plurality of cables;

a plurality of antennas corresponding to a plurality of terminal ends of the cable distribution network, wherein an antenna of the plurality of antennas comprises:

an antenna element configured to perform wireless transmission and reception of the wireless LAN radio signals;

an antenna connector configured to be communicatively coupled to a terminal connector associated with a terminal end of the plurality of terminal ends; and an antenna impedance matching unit configured to match an antenna impedance of the antenna element with a cable impendence of the terminal connector.

11. The kit of claim 10, wherein the input port of a splitter pigtail cable assembly comprises a 75-ohm F-female connector, to which is crimped and soldered a plurality of wire conductors of a plurality of output cables with 75-ohm F-female connectors configured to mate at 75-ohm characteristic impedance with a plurality of F-male connectors corresponding to a plurality of cables, wherein the plurality of cables comprises RG-6 cables.

12. The kit of claim 10, wherein each of the plurality of bidirectional signal pathways offers a predetermined common attenuation.

13. The kit of claim 10, wherein the plurality of splitter output ports comprises at least one of two, three and four, output ports.

14. The kit of claim 10, wherein at least one channel of the wireless LAN radio signals comprises a channel within at least one of the frequency ranges from 2.4 to 2.5 GHz and from 4.9 to 5.9 GHz.

15. The kit of claim 10, wherein the plurality of 50-ohm-SMA-to-75-ohm cable impedance matching units comprises a 50-ohm-SMA-to-75-ohm adapter and a 50-ohm-SMA-to-75-ohm antenna assembly.

16. The kit of claim 10, wherein the antenna further comprises a flexible joint connected to the antenna element, wherein the flexible joint is configured to allow the antenna element to be positioned in one of a plurality of orientations.

17. The kit of claim 10, wherein the antenna comprises a 50-ohm dipole antenna, wherein the antenna connector comprises a 75-ohm F-male connector as an impedance matching unit, wherein the terminal connector comprises an F-female connector.

18. The kit of claim 10 further comprising a plurality of bidirectional diplexers, wherein a bidirectional diplexer comprises:

a first F-female input port configured to operate at a frequency range of 2.4 to 2.5 GHz and 4.9 to 5.8 GHz;

a second F-female input port configured to operate at a frequency range of 5 MHz to 2,300 MHz; and an F-male output port configured to converge signals received on each of the first input port and the second input port.

19. The kit of claim 10 further comprising at least one point-of-entry filter configured to be communicatively coupled to a feed line connecting the cable distribution network to an external access network, wherein the point-of-entry filter is further configured to suppress passage of wireless LAN radio signals from the cable distribution network into the external access network.

20. The kit of claim 19, wherein the point-of-entry filter is characterized by a pass band in the range of 5 to 1,002 MHz and a plurality of stop bands in the range of 1,125 to 1,675 MHz, 2.4 to 2.5 GHz, and 4.9 to 5.9 GHz.

* * * * *